No. 733,813. PATENTED JULY 14, 1903.
R. N. CHAMBERLAIN.
STORAGE BATTERY.
APPLICATION FILED APR. 16, 1902.

NO MODEL.

Witnesses

Inventor.

No. 733,813. Patented July 14, 1903.

UNITED STATES PATENT OFFICE.

RUFUS N. CHAMBERLAIN, OF DEPEW, NEW YORK, ASSIGNOR TO THE GOULD STORAGE BATTERY COMPANY, OF NEW YORK, N. Y., A CORPORATION OF WEST VIRGINIA.

STORAGE BATTERY.

SPECIFICATION forming part of Letters Patent No. 733,813, dated July 14, 1903.

Application filed April 16, 1902. Serial No. 103,090. (No model.)

*To all whom it may concern:*

Be it known that I, RUFUS N. CHAMBERLAIN, a citizen of the United States, residing at Depew, in the county of Erie and State of New York, have invented certain new and useful Improvements in Storage Batteries, of which the following is a specification.

This invention relates to improvements in storage batteries, and has a particular application to cases where a storage plant is desired to furnish current of high potential but comparatively small quantity. In such cases the capacity for high-discharge rate of the ordinary storage battery is of comparatively little advantage, while its inconvenience, weight, and cost are serious disadvantages.

The object of the present invention is to provide storage-battery cells which may be assembled in series with a minimum of trouble and will be more than usually free from liability to injury by buckling or short-circuiting, so that comparatively little care will be needed in keeping a high-tension plant with a great number of cells in good condition.

Figure 1:
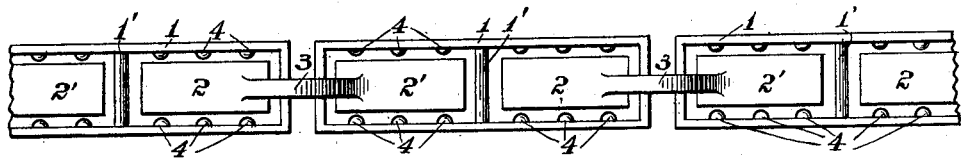
Figure 2:
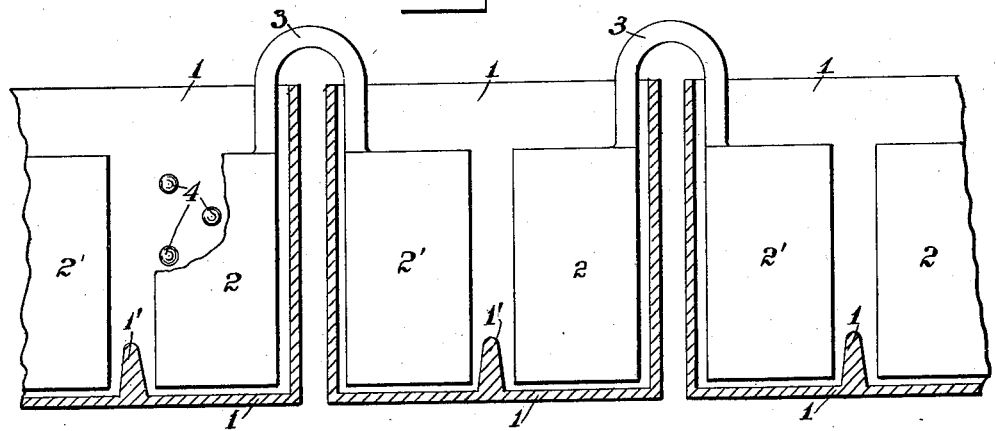
Figure 3:
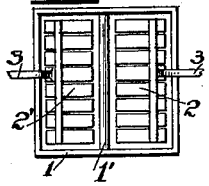

In the accompanying drawings, Figure 1 is a plan view of a plurality of storage-battery cells constructed and arranged according to my invention. Fig. 2 is a vertical section thereof. Fig. 3 is a plan view of a modified form of the invention.

Referring to Figs. 1 and 2, the jars or cell bodies or containing vessels 1, of glass, hard rubber, or other suitable material, are formed with central ribs or ridges 1' on the bottoms thereof, dividing the lower part of each cell into separate pockets. The electrode-plates are arranged in pairs, the positive plate 2 of one cell being connected to plate 2' of the next cell by a yoke or arched connector 3, so that no detachable connections are required, but circuit is completed for each cell by simple insertion of the electrode-plates therein. Each positive and negative plate is somewhat thinner than the width of the cell, so that when the plates are placed with their greatest length parallel to the length of the cell, as indicated, room will be left on each side of the plate between the plate and the cell-walls for free circulation of the electrolyte. Bosses or projections 4 on the inside of the cell-walls confine and support the plate laterally in such position without substantial interference with access of the electrolyte to all portions thereof. The positive and negative plates of each cell being at opposite ends or in opposite pockets of the cells are separated at the bottom of the cell by the rib or ridge 1', and at the top of the cell they are held apart by the attachment through the arched connectors 3 to the plates of adjacent cells. The electrode-plates 2 2' in each cell are arranged edgewise to each other—that is, edge to edge—but somewhat separated and with their greatest lengths in line with one another and parallel with the length of the cell.

The electrolytic resistance of a cell arranged as above described is higher than with the usual interlocking plates; but, as above stated, the present invention is particularly intended for uses where a low discharge rate only is required, and in such cases the internal resistance is not of great importance. On the other hand, the fact that the cells are in separate pockets is of advantage, for the reason that any material falling from either plate will drop into the bottom of the corresponding pocket and, remaining in contact with the said plate, will not only avoid the risk of short-circuiting encountered under similar circumstances with the usual form of storage battery, but will actually continue to perform more or less of its normal function, owing to its contact with the plate. In other words, the particles that fall from the plate and remain in the pocket will still act as parts of electrode and will be virtually an extension thereof. Another important advantage is the freedom from buckling obtained by the above-described construction. When cells of a small capacity and each comprising a single positive and a single negative plate are arranged with the flat sides opposed to one another, it is obvious that the adjacent sides of the respective plates will be much more subject to the electrolytic action than the remote sides of the said plates. The more violent expansion and contraction of the internal sides of the plates as compared to the external sides will result in buckling and rapid deterioration of the plates; but by placing the plates edge to edge, as above described, the two sides of each plate are put on exact equality as regards electrolytic action and the tendency to buckling is reduced to a minimum. Both of these advantages are of extreme importance in a plant having a large number of cells in order to obtain high potential, and yet of such small current output that the amount of energy involved, and therefore the amount which can be expended in inspection and oversight, is comparatively small.

In certain cases the idea of placing the opposite electrodes in separate pockets may have advantageous application, even where a cell contains a plurality of plates of each polarity. Thus in Fig. 2 is indicated a storage-cell whose jar 1 is provided with a central rib 1', separating its lower portion into two pockets or compartments, in which rest the two sets of electrode-plates 2 2'.

Having thus described my invention, the following is what I claim as new therein and desire to secure by Letters Patent:

1. A storage-battery cell comprising a containing vessel having a rib dividing its lower portion into separate pockets, electrode-plates of opposite polarity arranged in the separate pockets, said pockets being of a character to catch and retain material dropping from the plates therein separate from the adjacent electrode-plates.

2. A storage-battery cell comprising a containing vessel having its lower portion formed with separate pockets, an electrode-plate in each of said pockets, the electrode-plate of one pocket being of opposite polarity to that in an adjacent pocket, and the pockets being of a character to catch and retain material dropping from the plates therein separate from the adjacent electrode-plates.

3. A storage-battery cell comprising a containing vessel having its lower interior portion formed with separate pockets, and projections on opposite side walls, electrode-plates in said pockets arranged edge to edge and supported laterally by said projections, the plate in one pocket of opposite polarity to the plate in the other pocket.

4. A storage-battery comprising a plurality of cells and a plurality of pairs of electrodes, each pair of electrode-plates of opposite polarity being connected by a yoke reaching from cell to cell, and the electrode-plates in each cell being arranged with their lengths in line with one another and parallel to the length of the cell.

5. A storage-battery cell comprising a containing vessel having projections on each side, and electrode-plates of opposite polarity arranged within said vessel with their lengths in line with one another and parallel to the length of the cell, the said plates being confined between the projections on the sides of the cell.

6. A storage-battery comprising a plurality of cells, each cell having a rib dividing its bottom portion into pockets and pairs of electrode-plates, each pair comprising a positive and negative electrode connected by a yoke extending from cell to cell to mechanically and electrically connect the positive electrode of each cell with the negative electrode of an adjacent cell.

RUFUS N. CHAMBERLAIN.

Witnesses:
A. H. SNYDER,
A. G. GILPATRICK.